Sept. 4, 1956 M. HIRSCHEY ET AL 2,761,379
MARKING APPARATUS
Filed March 25, 1952 6 Sheets-Sheet 1
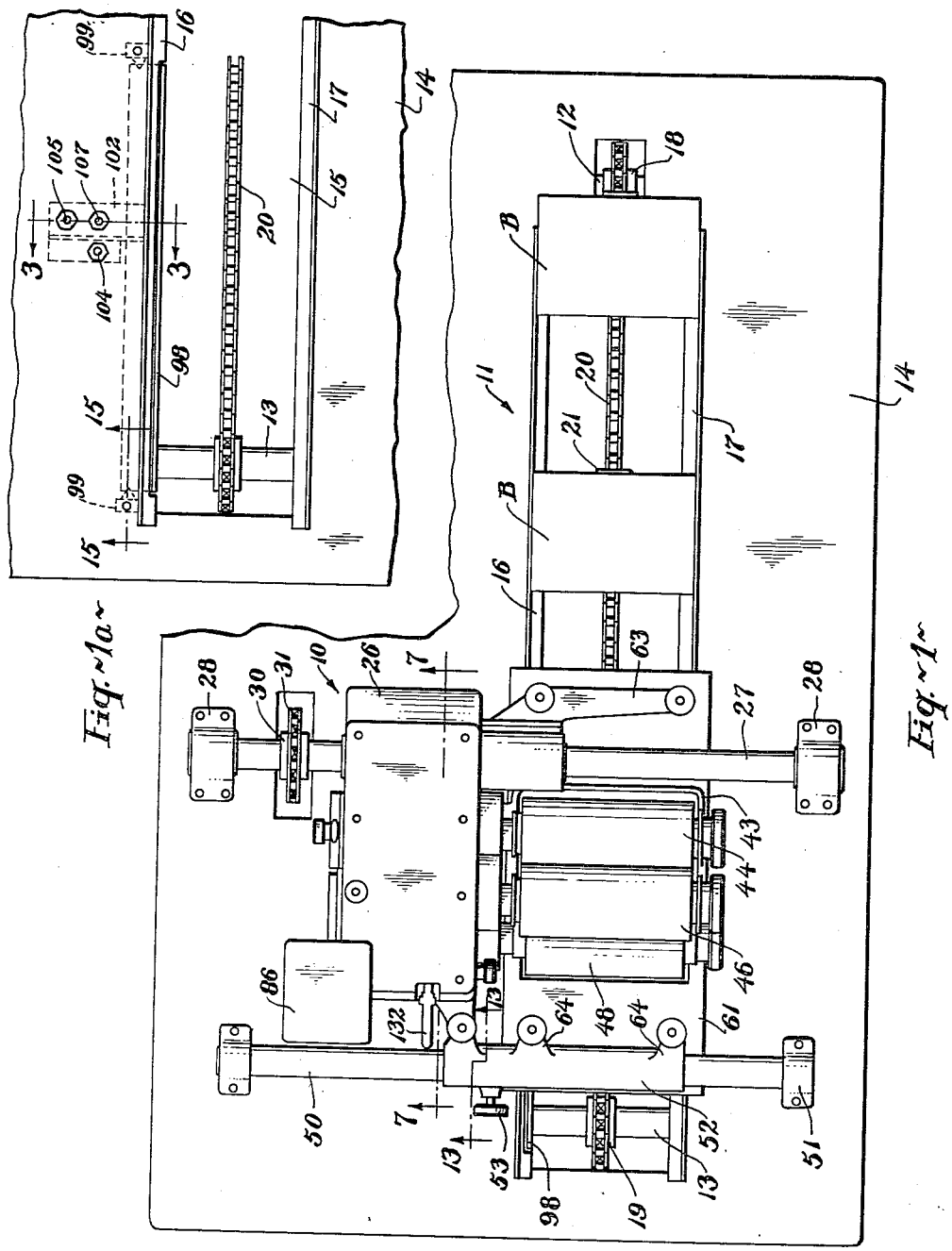
INVENTORS.
MALCOLM HIRSCHEY and
BY ANDREW J. ALESSI, Jr.
ATTORNEY.

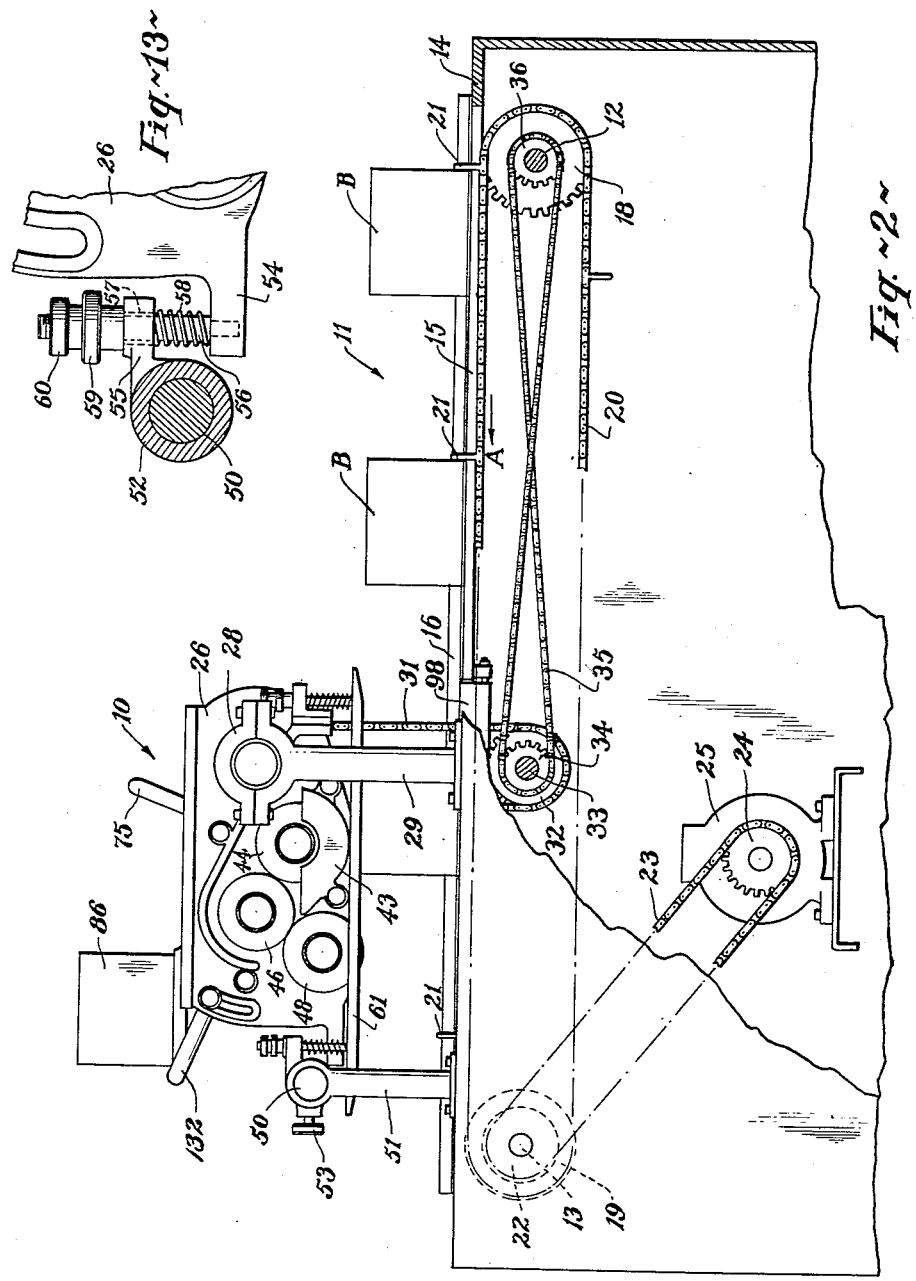

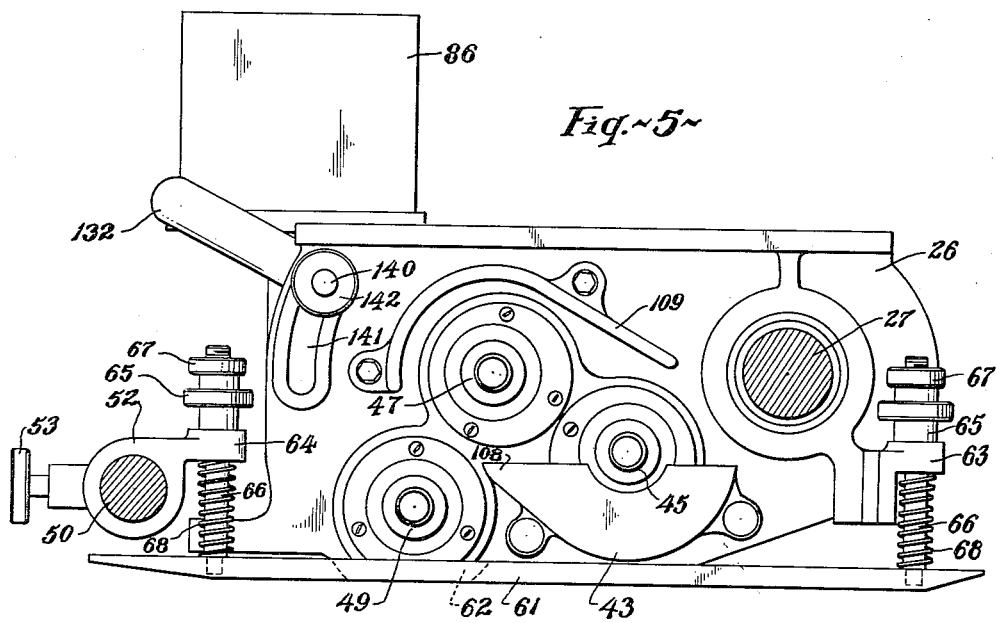
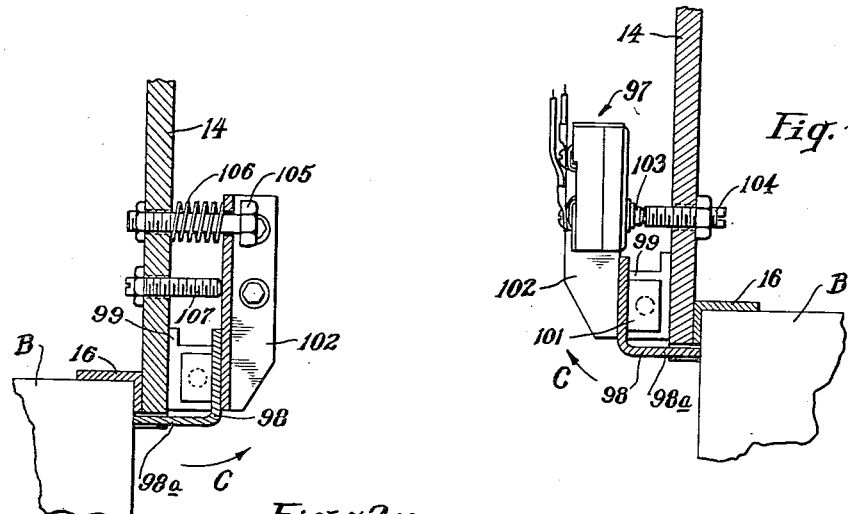

Sept. 4, 1956 M. HIRSCHEY ET AL 2,761,379
MARKING APPARATUS
Filed March 25, 1952 6 Sheets-Sheet 4
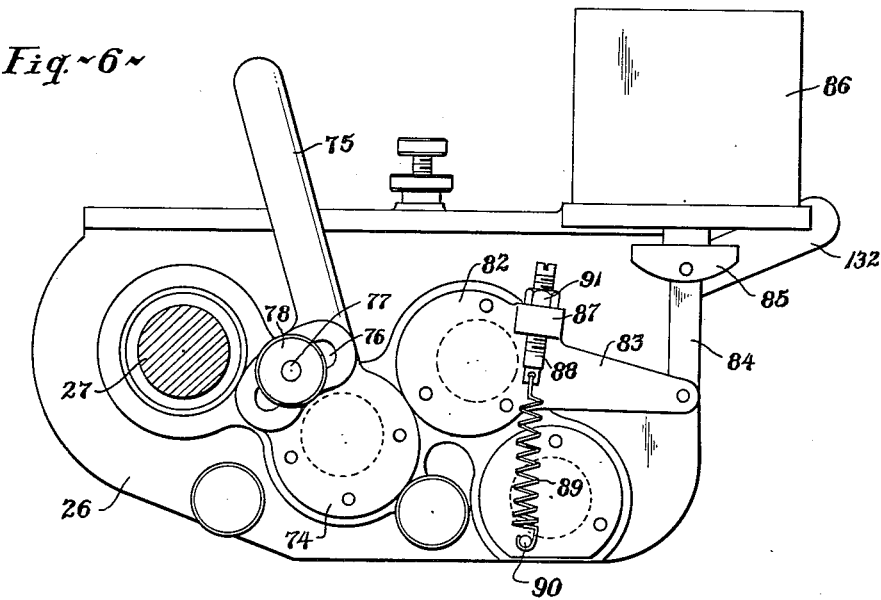
Fig.-6-
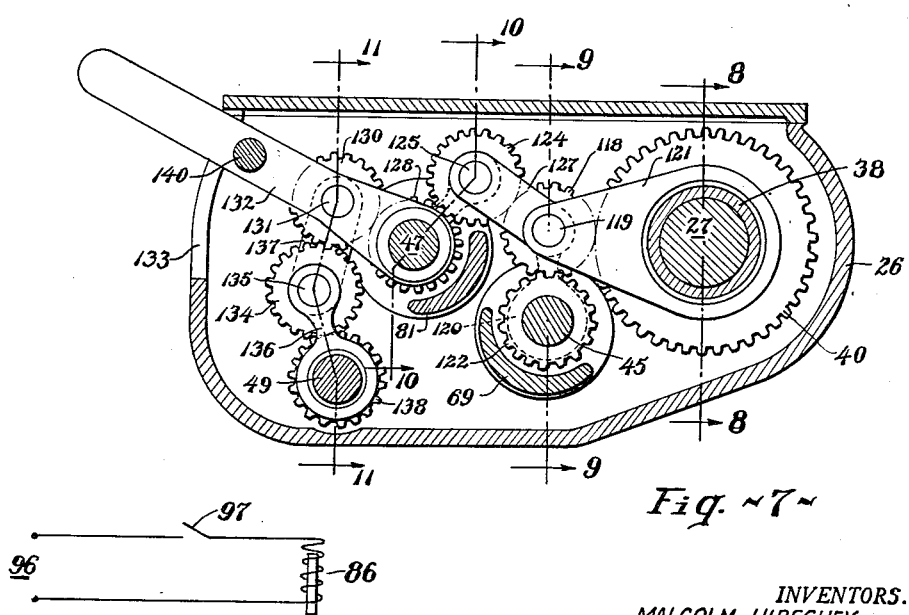
Fig.-7-
Fig.-12-
INVENTORS.
MALCOLM HIRSCHEY and
ANDREW J. ALESSI, Jr.
BY
ATTORNEY

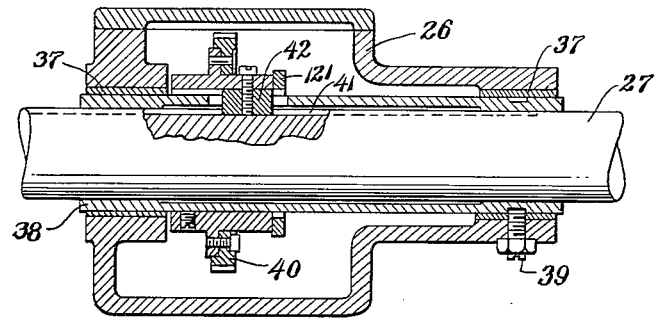
Fig.-8-
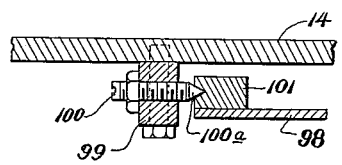
Fig.-15-
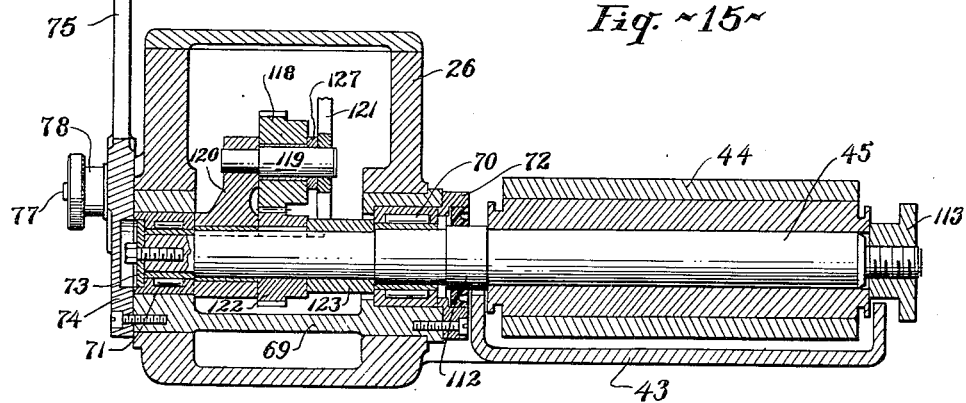
Fig.-9-

Sept. 4, 1956  M. HIRSCHEY ET AL  2,761,379
MARKING APPARATUS
Filed March 25, 1952  6 Sheets-Sheet 6
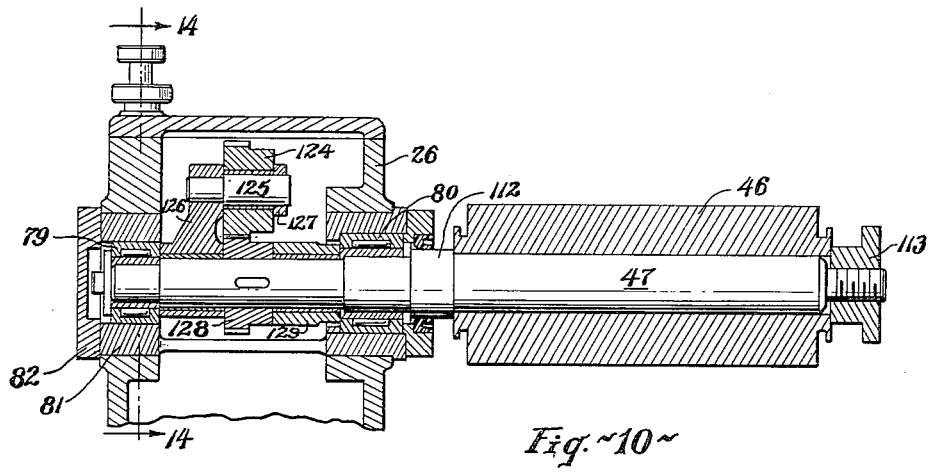
Fig.-10-
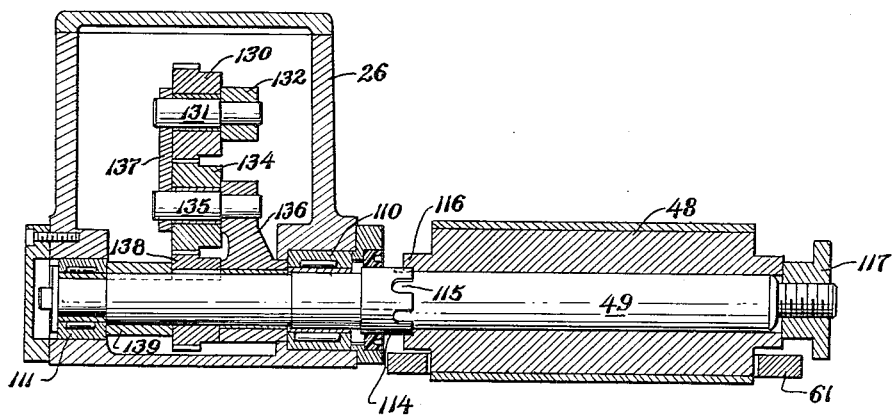
Fig.-11-
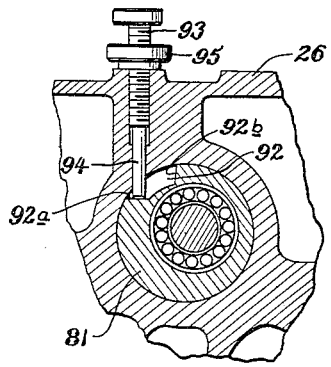
Fig.-14-
INVENTORS.
MALCOLM HIRSCHEY and
BY ANDREW J. ALESSI, JR.
ATTORNEY.

United States Patent Office 2,761,379
Patented Sept. 4, 1956

2,761,379

MARKING APPARATUS

Malcolm Hirschey, Woodside, N. Y., and Andrew J. Alessi, Jr., Colonia, N. J., assignors to Adolph Gottscho, Inc., Hillside, N. J., a corporation of New York Application March 25, 1952, Serial No. 278,362

5 Claims. (Cl. 101—37)

The present invention relates to apparatus for marking successive articles moving along a conveyor, and particularly to marking apparatus applying an inked impression to the successive articles.

An object of the present invention is to provide a marking apparatus including a die member at a marking station for contacting successive articles conveyed past the die member, an inking assembly for supplying ink to the die member and an automatic control arrangement for interrupting the supplying of ink to the die member when there is no article positioned to be marked so that the accumulation of an excess of ink on the die member will be avoided.

Another object is to provide a marking apparatus of the described character wherein the automatic control arrangement for interrupting the supplying of ink to the die member is actuated by the successive articles moving along the associated conveyor and operates in response to the occurrence of an excessive gap between successive articles approaching the marking station.

Another object is to provide a marking apparatus of the described character wherein the inking assembly includes an ink supplying roll dipping into an ink fountain and an ink metering roll positioned for rolling contact with the ink supplying roll and the die member, and the control arrangement for interrupting the supplying of ink to the die member operates to separate the die member and metering roll when no article to be marked is approaching the marking station, that is, when the article flow is interrupted.

In accordance with the present invention marking apparatus embodying the present invention includes a die roll position at a marking station adjacent a conveyor which operates to carry successive articles past the marking station. An ink supplying system is provided for supplying ink to the die roll and includes an ink supplying roll dipping into an ink fountain or reservoir and a metering roll rotatably mounted for rolling contact with the ink supplying roll and with the die roll. The mounting for the metering roll includes a displaceable eccentric movable between a first position in which the metering roll contacts the die roll and a second position in which the metering and die rolls are separated. The displaceable eccentric is yieldably urged to its first position and an actuating solenoid is connected thereto and, when energized, shifts the displaceable eccentric to its second position. An energizing circuit is provided for the solenoid and includes a micro-switch having switch actuating means associated therewith and engaged by the successive articles moving along the conveyor so that the micro-switch is open and the solenoid de-energized, when an article engages the switch actuating means, and the micro-switch is closed to complete the energizing circuit to the solenoid, whenever the switch actuating means is free of an article on the conveyor, for example, when the flow of articles is interrupted.

A further object of the present invention is to provide marking apparatus of the described character wherein the inking system for supplying ink to the die or printing roll includes an ink supplying roll dipping into a fountain or reservoir, a metering roll mounted for rolling contact with the die roll and with the ink supplying roll, and mechanism for varying the contact pressure between the ink supplying and metering rolls.

A still further object of the present invention is to provide marking apparatus for imprinting articles, cartons and the like moving along a conveyor and including mechanism for driving the marking apparatus in synchronism with the movement of the conveyor and constructed to permit adjustment of the location of the impression applied by the marking apparatus relative to the successive articles.

Still another object is to provide marking apparatus for imprinting successive articles carried past a marking station in predetermined spaced relationship by a conveyor and including a die roll arranged for contact with the successive articles at the marking station, and a drive assembly driven by the conveyor and synchronously driving the die roll, the drive assembly being constructed and arranged to permit angular adjustment of the die roll independent of the conveyor during operation of the apparatus for varying the location of the impression applied to the successive articles.

In accordance with the present invention angular adjustment of the die roll of the marking apparatus independent of the conveyor is obtained by providing a drive assembly between the conveyor and die roll which includes an epicyclic gear train having a gear manually displaceable around another gear to vary the angular relationship of the driving and driven gears.

The above and other objects, features and advantages of the present invention will be manifest in the following detailed description of illustrative embodiments which is to be read in connection with the accompanying drawings forming a part hereof and wherein:

Fig. 1 is a top plan view of a device including marking apparatus and an associated conveyor and embodying the present invention, with a shield or cover of the marking apparatus being removed to show the location of parts therebeneath;

Fig. 1a is a fragmentary plan view of the device of Fig. 1, but with the marking apparatus removed to show the location of parts located therebeneath;

Fig. 2 is a side elevational view, partly broken away and in section, of the marking apparatus and conveyor of Fig. 1;

Fig. 3 is a transverse sectional view taken along the line 3—3 of Fig. 1a and on an enlarged scale to show the details of a switch actuating assembly included in the embodiment of Figs. 1 and 2;

Fig. 4 is a detail elevational view of the switch actuating assembly of Fig. 3, but viewed in the opposite direction to show the mounting of a switch thereon;

Fig. 5 is a detail side elevational view of the marking apparatus of Figs. 1 and 2, and on an enlarged scale, but with the die or printing roll and the rolls supplying ink thereto being removed;

Fig. 6 is a detail side elevational view of the marking apparatus of Figs. 1 and 2, as viewed from the side opposite to that shown in Fig. 5 and on the same scale as the latter;

Fig. 7 is a longitudinal sectional view of the marking apparatus taken along the line 7—7 of Fig. 1 and on an enlarged scale;

Fig. 8 is a transverse sectional view taken along the line 8—8 of Fig. 7;

Fig. 9 is a transverse sectional view taken along the line 9—9 of Fig. 7;

Fig. 10 is a fragmentary transverse sectional view taken along the line 10—10 of Fig. 7;

Fig. 11 is a transverse sectional view taken along the line 11—11 of Fig. 7;

Fig. 12 is a wiring diagram showing an electric circuit included in the apparatus of Figs. 1 and 2;

Fig. 13 is a fragmentary sectional view taken along the line 13—13 of Fig. 1 and on an enlarged scale;

Fig. 14 is a fragmentary sectional view taken along the line 14—14 of Fig. 10; and Fig. 15 is a fragmentary sectional view taken along the line 15—15 of Fig. 1a, but on an enlarged scale.

Referring to the drawings in detail, and initially to Figs. 1 and 2 thereof, a marking apparatus, generally identified by the reference numeral 10, is there shown associated with an article conveyor assembly 11 in accordance with the present invention. The conveyor assembly 11 includes horizontal shafts 12 and 13 mounted rotatably below a suitably supported plate member 14 having a longitudinal opening 15 formed therein. Article guides 16 and 17 are secured on the top of member 14 along the opposite side edges of the opening 15 to laterally position the successive articles as the latter are moved longitudinally over opening 15 past the marking apparatus 10. Sprockets 18 and 19 are fixed on the shafts 12 and 13, respectively, and a continuous or endless chain 20 is trained over these sprockets. Pushing members or lugs 21 extend from chain 20 at suitably spaced apart locations and are dimensioned to project through the opening 15, when moving along the upper run of the chain, for engaging an article between the guides 16 and 17 and propelling the engaged article past the marking apparatus.

In order to drive the chain 20 in the direction indicated by the arrow A of Fig. 2, a drive sprocket 22 is fixed on shaft 13 and is engaged by an endless chain 23 which runs around another sprocket 24 connected to the shaft of an electric motor 25.

The articles B to be marked or imprinted may be brought to the beginning of the conveyor (the right hand end in Fig. 2) either manually or by any suitable mechanical or automatic means (not shown) and the successive pushing members 21 engage behind successive articles to propel the latter in spaced relationship depending upon the distance along chain 20 between adjacent pushing members.

The marking apparatus 10 illustrated in the drawings is provided for marking or imprinting the upwardly facing surfaces of the conveyed articles, and includes a housing or casing 26 which is swingably mounted adjacent its front end, that is, the end first reached by the conveyed articles, on a rotatable shaft 27 which extends transversely across the plate member 14 and is journalled at its opposite ends in bearing blocks 28 supported above the member 14 by suitable standards 29. Shaft 27 is the driving shaft for the marking apparatus, as well as contributing to its support, and is driven in synchronism with the conveyor. Such drive of the shaft 27 may be effected by an arrangement including a sprocket 30 fixed on shaft 27 (Fig. 1) and driven by an endless chain 31 (Figs. 1 and 2) which is in turn driven by another sprocket 32 fixed to a jack shaft 33 (Fig. 2) mounted rotatably below plate member 14. The jack shaft 33 has a sprocket 34 fixed thereon and driven by an endless chain 35 which is crossed and runs over a sprocket 36 rotating with shaft 12 of the conveyor assembly so that jack shaft 33 and shaft 27 will be rotated from shaft 12 but in the opposite direction.

The mounting of casing 26 upon rotated shaft 27 is shown in detail in Fig. 8 and preferably includes bearings 37 carried by the casing and rotatably receiving an open ended bushing 38 through which the shaft 27 extends. The bushing 38 is held against axial movement by a set screw 39 carried by the casing and loosely engaging in an annular groove formed in the outer surface of the bushing. The bushing 38 carries a spur gear 40 within the casing 26, the gear 40 being fixed relative to the bushing by suitable means, for example, a set screw, and the bushing 38 is connected to shaft 27 for rotation with the latter by a suitable slot and key arrangement 41 and 42, respectively. The specific purpose of the gear 40 will be described hereinafter, but for the present it will merely be referred to as a part of the gear train causing operation of the marking apparatus.

As seen in Fig. 1, the casing 26 is laterally disposed in a location to one side of the opening 15. An ink reservoir or fountain 43 (Figs. 5 and 9) extends from the side of casing 26 to overlie the opening 15 or path of travel of the conveyed articles. The marking apparatus includes an ink supplying roll 44 (Figs. 1 and 9) which is mounted on a shaft 45 rotatably supported in casing 26 and extending from the side of the latter so that roll 44 dips into the reservoir or fountain 43. A metering roll 46 (Figs. 1 and 10) is mounted on a shaft 47 which is also rotatably supported in casing 26 and extends from the side of the latter at a location adjacent roll 44 so that the metering roll 46 effects rolling contact with the ink supplying roll. In addition to the rolls 44 and 46, marking apparatus 10 includes a die or printing roll 48 (Figs. 1 and 11) mounted on a shaft 49 rotatably supported in casing 26 and extending from the side of the latter at a location adjacent the bottom and rear end thereof so that the die roll is positioned for rolling contact with the metering roll 46 and extends below the bottom of the casing for imprinting contact with the upper surfaces of the successive articles as the latter are conveyed past the marking apparatus.

Ink supplying roll 44, metering roll 46 and die roll 48 are simultaneously rotated by a transmission driven by gear 40 on shaft 27, and hereinafter described in detail, and the ink supplying roll picks up ink from the reservoir 43 and applies the ink to the surface of the metering roll. The ink film applied to the metering roll is then transferred to the surface of the type on the die or printing roll and the latter produces the desired inked impressions on the successive articles.

The rear end of casing 26, that is, the end remote from shaft 27, is suspended from a cross-member 50 which is carried in an elevated position above plate member 14 by suitable standards or posts 51 (Figs. 1 and 2). The suspension for the rear end of casing 26 preferably includes a sleeve 52 (Figs. 1 and 13) slidable laterally on cross-member 50 and held in fixed position on the latter by a set screw 53. An ear 54 projects from casing 26 and underlies a lug 55 (Fig. 13) extending from an end portion of sleeve 52. A threaded bolt 56 extends upwardly from ear 54 and passes loosely through an opening 57 formed in lug 55. A helical spring 58 extends around bolt 56 between lug 55 and ear 54 to yieldably urge the latter downwardly, and an adjusting nut 59 and lock nut 60 are threaded on bolt 56 above lug 55 to adjustably limit the downward travel of the bolt 56 and hence of ear 54 and casing 26. The above described suspension permits adjustment of the vertical position of the die or printing roll 48 relative to the surface of member 14 and allows for upward displacement of the die roll, against the force of spring 58, in accordance with possible surface irregularities in the articles being marked. While a particular structure for yieldably and adjustably mounting casing 26 above the conveyor has been shown and described, it is to be understood that other mounting arrangements may be employed in connection with marking apparatus embodying the present invention.

In order to prevent upward displacement or rocking of the successive articles during their travel under the die or printing roll 48, the illustrated marking apparatus includes a resiliently supported pressure plate 61 (Figs. 1, 2, 5 and 11) positioned to bear down on the top surfaces of the articles during the marking thereof and formed with an opening or cutout 62 through which the die roll 48 is adapted to project. The pressure plate 61 is resiliently suspended at its opposite ends from the sleeve 52 on cross-member 50 and from a bracket 63 which extends laterally from casing 26. Sleeve 52 is formed with lugs 64 (Fig. 5), and a bolt 66 extends upwardly from plate 61 through each of the lugs 64 and the bracket 63. An adjustment nut 65 and lock nut 67 is threaded on the upper end of each bolt 66 to limit the downward movement of the related corner portion of the pressure plate, and a helical spring 68 is disposed around each bolt 66 between the plate 61 and either the lug 64 or bracket 63, as the case may be.

In order to vary the contact pressure between the metering roll 46 and the ink supplying roll 44, the structure supporting the shaft 45 carrying roll 44 is constructed and arranged to permit transverse displacement of the axis of rotation of shaft 45. In the illustrated embodiment, the structure supporting shaft 45 (Fig. 9) includes a sleeve or bushing 69 extending through the casing 26 and rotationally adjustable relative to the latter. The sleeve 69 is formed with a longitudinal bore which is eccentric relative to the cylindrical outer surface thereof, and roller bearings 70 and 71 are mounted in the opposite end portions of that bore and rotatably carry the shaft 45. An annular locking plate 72 retains bearing 70 within sleeve 69, and axial movement of shaft 45 relative to the bearings is prevented by a disc 73 secured to the end of the shaft and abutting against bearings 71. A plate 74 is secured to and closes the end of sleeve 69 remote from the roll 44 and abuts against the casing to prevent axial movement of the eccentric sleeve. In order to provide for manual rotational or angular adjustment of the eccentric sleeve 69, a handle 75 extends from plate 74. As seen in Fig. 6, the plate 74 is formed with an arcuate slot 76 through which a stud 77 carried by casing 26 loosely extends. A knurled nut 78 is threaded upon stud 77 to engage against plate 74 for holding the latter and the eccentric sleeve 69 in their adjusted position.

In accordance with the present invention, the transfer of ink to the die or printing roll 48 is halted whenever the flow of articles past the marking apparatus is interrupted. Thus, the ink will not build-up on the die roll surface when operation of the apparatus continues in the asbence of articles on the conveyor or when there is an excessive gap between successive articles on the conveyor. Since ink is transferred from the metering roll to the die roll only when an article is available to be marked, the ink on the die roll will be accurately controlled by the metering roll to produce a clear and uniform impression. Cessation of the transfer of ink from the metering roll to the die roll may be effected by separating the surfaces thereof, and such separation may be achieved by laterally displacing the axis of rotation of either metering roll 46 or of die roll 48. In the illustrated embodiment of the invention, structure is provided for laterally shifting the axis of rotation of metering roll 46 while the axis of rotation of the die roll 48 is stationary.

Referring now to Fig. 10, it will be seen that shaft 47, on which the metering roll is mounted, is supported in suitable bearings 79 and 80 carried in the internal bore of a sleeve 81. The sleeve 81 is formed with a cylindrical outer surface and its internal bore, receiving the shaft supporting bearings, is eccentric relative to the outer surface. The eccentric sleeve 81 extends through casing 26 and is rotationally or angularly adjustable relative to the latter to vary the distance between the axes of rotation of rolls 46 and 48. Axial movements of the bearings and shaft relative to sleeve 81 are restrained by structure similar to that described in connection with Fig. 9 and the end of sleeve 81 remote from roll 46 is closed by a plate 82 (Figs. 6 and 10) secured thereto.

In accordance with the present invention, the presence or absence of articles on the conveyor 11 moving into position to be marked determines the angular position of sleeve 81. That is, eccentric sleeve 81 is angularly movable between a first position in which roll 46 contacts roll 48 and a second position in which the surfaces of rolls 46 and 48 are separated, and the marking apparatus 10 includes devices operative to move sleeve 81 to its first position when articles are moving normally past the marking station and to shift sleeve 81 to its second position whenever the flow of articles is interrupted or an excessive gap occurs between successive articles on the conveyor. In the illustrated embodiment, such devices include an arm 83 extending from plate 82 (Fig. 6) and connected by a link 84 to the plunger 85 of a solenoid 86 which is mounted upon the top of casing 26. The solenoid 86 is arranged so that, when it is energized, the plunger thereof moves upwardly to rotate the sleeve 81 to its position spacing the surface of metering roll 46 from the surface of die roll 48. The sleeve 81 is preferably yieldably urged to its position in which the surfaces of rolls 46 and 48 are in contact, and for this purpose a lug 87 extends from plate 82 in a location off-set radially from the axis of rotation of sleeve 81. A screw member 88 threadably extends through lug 87 and connects to one end of a spring 89 which is attached at its other end to a part secured on casing 26, as at 90. A lock nut 91 is threaded onto member 88 to hold the latter in adjusted position relative to the lug 87, and the member 88 may be adjusted relative to lug 87 to vary the tension force exerted by spring 89 and tending to rotate sleeve 81 to its position effecting surface contact of the rolls 46 and 48.

Referring to Fig. 14, a preferred structure is there shown for limiting the angular movements of eccentric sleeve 81 and includes a segmental cut-out or recess 92 formed in the outer surface of the eccentric sleeve and a stop member 93 threadably carried by casing 26 and having an end portion 94 adapted to enter into recess 92. A lock nut 95 may be provided on stop member 93 to hold the latter in adjusted position relative to the casing. When the end face 92a of the recess 92 engages against end portion 94 of the stop member, as in Fig. 14, the stop member prevents further rotation of sleeve 81 under the influence of spring 89 and thereby determines the degree of contact or clearance existing between the die roll and the metering roll during the transfer of ink from the latter. When the solenoid 86 is energized, engagement of the end face 92b of recess 92 against end portion 94 of the stop member limits the rotation of sleeve 81 to a position in which substantial clearance is provided between the surfaces of the metering and die rolls so that no ink is transferred to the latter.

As seen in Fig. 12, the solenoid 86 is energized by an electric circuit extending from a power source 96 and having a switch 97 connected in series with the solenoid. The switch 97 is preferably a conventional microswitch in which the contacts are spring-urged together to complete the circuit, and pressure on the plunger extending from the switch housing is required to separate the contacts.

In accordance with the present invention, switch actuating mechanism is provided in association with the conveyor 11 and controlled by the articles propelled by the conveyor to maintain the switch contacts in open condition so long as articles are moving past the marking apparatus in a normal fashion, and to permit the switch contacts to close for completing the energizing circuit to the solenoid 86 whenever the flow of articles is interrupted or an excessive gap occurs between successive articles on the conveyor. In the illustrated embodiment (Figs. 1a, 3, 4 and 15) such switch actuating mechanism includes an elongated angle member 98 arranged along one side of the opening 15 and pivotally mounted for swinging movement about a longitudinal axis so that one flange 98a of the angle member may project above the article supporting surfaces of the guides 16 and 17 and into the path of the advancing articles. The end portions of the edge of flange 98a are suitably inclined or sloped so that the successive articles may ride easily onto the flange.

The pivotal supports for the opposite ends of angle member 98 may be of the kind shown in Fig. 15 which includes a hangar 99 depending from the plate member 14 and having a bearing member 100 extending threadably therethrough. Bearing member 100 is formed with a conical end 100a which projects into a suitable conical recess formed in a face of a block 101 carried by the end of angle member 98. Thus, the angle member 98 is free to rock about the axis defined by the conical points 100a.

As seen in Fig. 4, a bracket 102 is secured to the angle member 98 intermediate its length and extends laterally therefrom under the plate member 14. The micro-switch 97 is secured on the bracket 102 with its plunger 103 extending in the direction toward the underside of plate member 14. An abutment member, in the form of a screw 104, extends through plate member 14 in registration with the switch plunger 103. Thus, when the angle member 98 is swung in the direction of the arrows C on Figs. 3 and 4, by contact with an article B, the abutment screw 104 will engage plunger 103 to push the latter into the switch housing thereby separating the switch contacts and causing de-energization of the solenoid 86. The abutment screw 104 may be adjusted relative to plate member 14 to control the degree of angular movement of angle member 98 required to effect opening of the solenoid circuit.

As seen in Fig. 3, a bolt 105 extends loosely through the bracket 102 and depends adjustably from the plate member 14 to limit the swinging movement of the angle member 98 in the direction projecting flange 98a of the latter into the path of travel of the articles B. A helical spring 106 is disposed around bolt 105 between plate member 14 and bracket 102 for yieldably urging the latter against the head of the bolt to project the flange 98a into the path of the articles. Further, a screw stop 107 extends adjustably through plate member 14 and at its lower end is adapted to abut against bracket 102 for limiting the swinging of the latter in the direction causing opening of the contacts of switch 97. Thus, the switch cannot be damaged by excessive depression of its plunger 103.

Reviewing the operation of the above described portion of the device embodying the present invention, it is apparent that so long as articles are conveyed in a normal manner past the location of marking apparatus 10, the flange 98a of the angle member 98 will be continuously engaged by successive articles and will be disposed as shown in Figs. 3 and 4 for maintaining the contacts of switch 97 in their open condition thereby effecting de-energization of the solenoid 86. With the solenoid de-energized, spring 89 will be effective to position the eccentric sleeve 81 of the assembly supporting the metering roll so that the latter contacts the die or printing roll to transfer ink thereto. When the flow of articles is interrupted, or when a gap longer than the length of angle member 98 occurs between successive articles, flange 98a will be released and spring 106 (Fig. 3) will be effective to swing bracket 102 and angle member 98 in the direction counter to that indicated by the arrow C to thereby move the switch 97 away from the abutment screw 104 so that the plunger 103 is free to extend from the switch housing for closing the switch contacts. Closing of the switch contacts places the solenoid 86 in communication with the power source 96 for energizing the solenoid so that the plunger of the latter pulls upwardly on arm 83 (Fig. 6) to effect rotation of eccentric sleeve 81 to the position separating the surfaces of the metering and die rolls. Thus, the supplying of ink to the die or printing roll 48 is interrupted in response to an interruption in the flow of articles along the conveyor.

As seen in Fig. 5, the reservoir 43, at its rear end, projects substantially into the space between the metering and die rolls, as at 108, to underlie the metering roll and catch the ink dripping from the latter, particularly when the die and metering rolls are separated and the ink is not transferred from the metering roll to the die roll. Further, a shield or guard 109 may extend from the side of housing 26 to overlie the metering and ink supplying rolls and prevent the deposit thereon of foreign matter.

Referring to Fig. 11, it will be seen that shaft 49, on which the die roll 48 is mounted, is carried in suitable bearings 110 and 111 which are disposed in aligned openings formed in the casing 26. As seen in Figs. 9, 10 and 11, shafts 45, 47 and 49 respectively, are each supported in the casing only adjacent one end, with the respective roll being mounted on the shaft by sliding the roll over the free shaft end. Each of shafts 45 and 47 is formed with a shoulder 112 intermediate its length against which the respective roll abuts, and a knurled nut 113 is threaded onto the free end of the shaft to retain the roll on the latter. Shaft 49 (Fig. 11) is also formed with a shoulder 114 which is provided with notches 115 opening axially toward the free end of the shaft to receive complementary axial projections 116 formed on the adjacent end of the die roll, and a knurled nut 117 is threaded on the free end of shaft 49 to retain the die roll on the latter. It is apparent that the above described structure permits easy and rapid removal and replacement of the ink supplying, metering and die rolls, or any of them, and that the engagement of projections 116 in the notches 115 of the shoulder on shaft 49 prevents rotation of the die or printing roll 48 relative to its supporting shaft.

As previously mentioned, the shafts 45, 47 and 49 are rotated through a transmission driven by the gear 40 fixed on shaft 27, which is in turn rotated by connection to the conveyor 11. In accordance with the present invention, the transmission is constructed and arranged so that the angular position of shaft 49 carrying the die roll may be adjusted independent of the conveyor during the operation of the marking apparatus for shifting the location of the impression applied by the die roll to the successive articles.

Referring now to Figs. 7, 9, 10 and 11, wherein a transmission for rotating shafts 45, 47 and 49 is illustrated, it will be seen that gear 40 meshes with an idler gear 118 (Figs. 7 and 9) which is rotatable on a shaft 119 carried by a spider or arm 120 having an open-ended bushing integral therewith in which the shaft 45 is rotatable. The spider 120 is held against rotation with the shaft 45 by a link 121 which connects at one end to shaft 119 and at its other end loosely receives the driving shaft 27. A gear 122 is fixed on shaft 45, by a suitable key and slot or similar arrangement, and meshes with the idler gear 118. The gear 122 is preferably axially located on shaft 45 between the non-rotatable spider 120 and a suitable spacer 123. Thus, shaft 45 is rotated by the meshing engagement of gears 122, 118 and 40.

Gear 118 further meshes with another gear 124 (Figs. 7 and 10) which is rotatably mounted on a shaft 125 carried by a spider or arm 126 formed with an integral bushing through which the shaft 47 rotatably extends. A link 127 is connected at its opposite ends to the stub shafts 119 and 125 to prevent rotation of the spider 126 with the shaft 47 carrying the metering roll. A gear 128 is fixed on shaft 47 by a suitable key and slot arrangement, between the spider 126 and a suitable spacer 129 and meshes with the gear 124 so that the shaft 47 is driven by the meshing gears 128, 124, 118 and 40.

In order to permit angular adjustment of die roll shaft 49 relative to shafts 40, 45 and 47 during operation of the marking device, an epicyclic gear train is interposed between shaft 47 and shaft 49. This epicyclic gear train includes a gear 130 (Figs. 7 and 11) meshing with gear 128 on shaft 47 and rotatably mounted on a stub shaft 131 carried by an operating arm 132 which is integral with the spacer 129 on shaft 47 and is swingable around the axis of the latter. The operating arm 132 extends out of casing 26 through an opening 133 formed in the rear wall of the latter. Thus, the axis of rotation of gear 130 may be moved along an arcuate path concentric with the axis of rotation of meshing gear 128. Gear 130 also meshes with a gear 134 which is rotatably mounted on a stub shaft 135 carried by a spider or arm 136 having a bushing integral therewith through which the die roll shaft 49 rotatably extends. A link 137 is connected at its opposite ends to the stub shafts 131 and 135 to maintain a fixed distance between the latter so that gears 130 and 134 are continuously meshed even during manipulation of operating arm 132. A gear 138 is fixed on shaft 49 by a suitable key and slot arrangement between the spider 136 and a spacer 139, and meshes continuously with gear 134. Thus, shaft 49 carrying the die roll is rotated through the gear train including gears 138, 134, 130, 128, 124, 118 and 40.

When the operating arm 132 is manipulated to swing on shaft 47, gear 130 will travel around gear 128 so that the rotation of gear 130 will be the result of both the rotation of gear 128 and the movement of gear 130 around gear 128. Such composite rotation of gear 130 will be communicated to shaft 49 to angularly shift the latter independent of the movement of the pushing elements 21 on the conveyor chain 20. Thus, the location of the impression on each of the successive articles B located by the pushing elements may be varied or adjusted.

As seen in Fig. 5, a stud 140 extends from the operating arm 132 through an arcuate slot 141 formed in the side of casing 26, and a knurled nut 142 is threaded on stud 140 to engage against the side of the casing for locking the arm 132 in its adjusted position.

From the foregoing description of an illustrative embodiment of the present invention, it will be apparent that a device including a marking apparatus and associated conveyor has been provided wherein articles conveyed past the marking apparatus have an inked impression applied thereto by a suitable die roll which has ink supplied to the surface thereof in a metered and uniform manner so long as articles are available to be impressed or marked, and wherein the supplying of ink to the die roll is halted whenever the flow of articles past the marking apparatus is interrupted or an excessive gap occurs between successive articles.

Further, the above described illustrative embodiment of the invention provides for the synchronous driving of the conveyor operative to convey the articles in a predetermined spaced apart relationship and of the marking apparatus, with the drive for the marking apparatus including an arrangement for angularly shifting the die or printing roll thereof independent of the conveyor movement so that the location or alignment of the marks or impressions applied to the conveyed articles may be adjusted during the operation of the device and without interfering with the mechanism for interrupting the supplying of ink to the die roll.

While a preferred embodiment of the invention has been illustrated and described, it should be noted that the invention is not limited thereby and that various changes and modifications may be effected in the disclosed specific embodiment without departing from the scope of the invention which is intended to be defined in the appended claims.

What is claimed is:

1. In combination; conveyor means for carrying articles past a marking station; marking apparatus at said station including a printing roll positioned to apply an inked impression to each of the successive articles at said station, a metering roll for transferring ink to the surface of said printing roll, and angularly displaceable means supporting said metering roll for movement of the latter into and out of surface contact with said printing roll; and control means for effecting movement of said metering roll into surface contact with said printing roll in response to the presence of an article in the vicinity of said marking station and out of surface contact with said printing roll when the flow of articles past said station is interrupted thereby halting the transfer of ink to said printing roll, said control means including yieldable means connected directly to said supporting means for the metering roll and operative to continuously urge the supporting means in the angular direction moving the metering roll into surface contact with said printing roll, electro-magnetic means connected directly to said supporting means for the metering roll and effective, when energized, to angularly displace said supporting means in the direction moving the metering roll out of surface contact with said printing roll, electric circuit means for energizing said electro-magnetic means and having normally closed switch means interposed therein, and switch actuating means projecting into the path of travel of the articles carried by said conveyor means and operative, when engaged by an article, to open said switch means for effecting de-energization of said electro-magnetic means.

2. In combination; conveyor means for carrying articles past a marking station; marking apparatus at said station including a printing roll positioned to apply an inked impression to each of the successive articles at said station, a metering roll for transferring ink to the surface of said printing roll, a shaft having said metering roll mounted thereon, and an angularly displaceable eccentric sleeve having said shaft mounted rotatably therein so that angular displacement of said sleeve moves said metering roll into and out of surface contact with said printing roll; and control means including spring means connected to said eccentric sleeve and operative to yieldably displace the latter in the angular direction effecting movement of said metering roll into surface contact with said printing roll, electro-magnetic means operatively connected to said eccentric sleeve and effective, when energized, to angularly displace the latter in the direction moving the metering roll out of surface contact with the printing roll, electric circuit means for energizing said electro-magnetic means and having normally closed switch means interposed therein, and switch actuating means projecting into the path of travel of the articles carried by said conveyor means in the vicinity of said marking station and operative, when engaged by an article, to open said switch means for effecting de-energization of said electro-magnetic means, so that said metering roll is moved into surface contact with the printing roll in response to the presence of an article in the vicinity of said marking station and out of surface contact with the printing roll when the flow of articles past said station is interrupted thereby halting the transfer of ink to said printing roll.

3. The combination according to claim 2; wherein said spring means includes a spring member anchored at one end and an adjustable mounting member on said eccentric sleeve and connected to the other end of said spring member for varying the tension in the latter thereby permitting adjustment of the contact pressure between the surfaces of said metering and printing rolls.

4. The combination according to claim 2; including adjustable stop means engageable with said eccentric sleeve and operative to adjustably limit the angular displacement of said sleeve in said direction effecting movement of said metering roll into surface contact with said printing roll for varying the degree of surface contact between said rolls during the transfer of ink to said metering roll and to limit the angular displacement of said sleeve in said direction effecting movement of said metering roll out of surface contact with said printing roll.

5. The combination according to claim 2; wherein said switch means includes a housing and an operating plunger extensible from said housing and operative, when extended, to cause closing of said switch means and, when depressed into said housing, to cause opening of said switch means; and wherein said switch actuating means includes a feeler member projecting into the path of articles carried by said conveyor means, a pivotally mounted switch support connected to said feeler member and having said switch housing mounted thereon, an abutment mounted for engagement with said operating plunger to depress the latter into said housing when said switch support is rocked in one direction by engagement of said feeler member with an article, and spring means acting on said switch support to rock the latter in the opposite direction moving said feeler member into the path of articles carried by the conveyor means and permitting said operating plunger to extend from said switch housing.

References Cited in the file of this patent

UNITED STATES PATENTS

| | | |
|---|---|---|
| 771,699 | Blanchard | Oct. 4, 1904 |
| 1,174,989 | Jones | Mar. 14, 1916 |
| 1,475,687 | Cobb | Nov. 27, 1923 |
| 1,629,130 | Storck | May 17, 1927 |
| 1,721,922 | Roe | July 23, 1929 |
| 1,779,310 | Rischer | Oct. 21, 1930 |
| 1,850,801 | Langston et al. | Mar. 22, 1932 |
| 2,096,869 | Tornberg | Oct. 26, 1937 |
| 2,348,537 | Greenwood | May 9, 1944 |
| 2,466,968 | Ross | Apr. 12, 1949 |
| 2,588,480 | Burckhardt | Mar. 11, 1952 |
| 2,594,214 | Ras | Apr. 22, 1952 |